US011890920B1

(12) United States Patent
Siragusa et al.

(10) Patent No.: US 11,890,920 B1
(45) Date of Patent: Feb. 6, 2024

(54) SOFT TOP CONVERSION ASSEMBLIES, SYSTEMS AND METHODS

(71) Applicant: WOW AUTO TOPS, INC., Yorba Linda, CA (US)

(72) Inventors: Anthony B. Siragusa, Yorba Linda, CA (US); James E. Grimes, Yorba Linda, CA (US)

( * ) Notice: Subject to any disclaimer, the term of this patent is extended or adjusted under 35 U.S.C. 154(b) by 0 days.

(21) Appl. No.: 18/233,740

(22) Filed: Aug. 14, 2023

Related U.S. Application Data

(60) Provisional application No. 63/371,427, filed on Aug. 15, 2022.

(51) Int. Cl.
*B60J 7/11* (2006.01)

(52) U.S. Cl.
CPC ..................... *B60J 7/11* (2013.01)

(58) Field of Classification Search
CPC ....... B60J 7/10; B60J 7/11; B60J 7/102; B60J 7/014; B60J 7/106; B60J 7/104
USPC .................................................. 296/218, 219
See application file for complete search history.

(56) References Cited

U.S. PATENT DOCUMENTS

| | | | | |
|---|---|---|---|---|
| 4,850,634 A | * | 7/1989 | Taubitz | B60J 7/1265 296/121 |
| 9,403,423 B2 | * | 8/2016 | Yoshioka | B60J 10/18 |
| 9,527,372 B2 | * | 12/2016 | Suesada | B60J 10/90 |
| 2019/0118627 A1 | * | 4/2019 | Arens | B61D 39/002 |

* cited by examiner

*Primary Examiner* — Dennis H Pedder
(74) *Attorney, Agent, or Firm* — Charles L. Thoeming

(57) ABSTRACT

Improved soft top assemblies, systems, and methods to cover an open space above the driver and passenger seats of an automobile provide or use precision molded frame elements with interconnecting fastening assemblies to support a soft top cover attached to forward and rearward frame elements. A centrally hinged and pivoting stabilizing bar fitted within frame side elements maintains support and stability to the soft top cover. Forward and rearward frame elements provide mating surfaces matching existing OEM attachment points for a removable fitted hard top for the automobile. Each frame side element underside includes a channel sized to receive a corresponding closed automobile door windshield.

10 Claims, 12 Drawing Sheets

SOFT TOP CONVERSION ASSEMBLIES, SYSTEMS AND METHODS

CROSS-REFERENCES TO RELATED APPLICATIONS

This application claims the priority benefit of U.S. Provisional Utility Application No. 63/371,427, filed Aug. 15, 2022, the entirety of each of which is incorporated herein by reference.

STATEMENT REGARDING FEDERALLY SPONSORED RESEARCH OR DEVELOPMENT

None.

REFERENCE TO A MICRO-FICHE APPENDIX

None.

NOTICE REGARDING COPYRIGHTED MATERIAL

A portion of this patent document contains material subject to copyright protection and/or copyright registration. The copyright owner has no objection to the facsimile reproduction by anyone of the patent document or the patent disclosure as it appears in the file or records maintained by the United States Patent and Trademark Office, but the copyright owner otherwise reserves all copyright rights.

TECHNICAL FIELD

This invention relates to soft top conversion assemblies, systems, and methods. More particularly, it relates to assemblies and systems for an integral soft top that can be quickly assembled, fitted onto an automobile, removed, disassembled, and stored within the automobile, and methods of use for these systems and assemblies. The disclosed soft top conversion systems and assemblies provide an easily transportable and stored alternative to original equipment manufacturer (OEM) removable fitted hard top covers for sports cars providing an open-air portion above the driver and passenger seats for open air driving pleasure without space limitations of bulky transport of a fitted hard top cover.

BACKGROUND OF THE INVENTION

Numerous automobile manufacturers provide convertible sportscars which range from mechanically automated tops to removable hard tops to cover the sportscar interior. Removable fitted hard tops present storage issues for touring trips as the sportscars have limited storage area, and the fitted hard top requires most if not all the sportscar's storage space making it impossible to pack one or more suitcases or other items in the sportscar's singular storage compartment when the fitted hard top is stored in the compartment.

There is a need for an integral soft top conversion assembly that can be quickly assembled, fitted onto an automobile, removed, disassembled, and stored within the automobile without sacrificing the entire storage compartment space.

There is a need for an integral soft top conversion assembly that increases storage space by presenting a smaller storage footprint when the integral soft top conversion assembly is disassembled and stored in the sports car storage space.

An object of the integral soft top conversion assembly is to provide mating surfaces matching existing attachment points for a removable fitted hard top.

Another object of the integral soft top conversion assembly is to preserve the performance and design aesthetics of a high-performance sports car while protecting the occupants from the sun, wind, cold or hot external ambient temperatures, or inclement weather.

A further object of the integral soft top conversion assembly is to provide a storage bag for the disassembled soft top conversion assembly to protect the soft top while it is stored in the sports car storage space or other storage locations.

An added object of the integral soft top conversion assembly is to provide a soft top cover that includes UV protection and water resistance.

Yet another object of the integral soft top conversion assembly is to supplant the need for the OEM fitted hard top during touring trips, thus limiting any damage to the OEM fitted hard top.

A further object of the integral soft top conversion assembly is to enjoy open top driving more often without sacrificing most of the storage space in the sportscar.

DISCLOSURE OF INVENTION

An embodiment integral soft top conversion assembly provides a rectangular detachable frame assembly. The rectangular detachable frame assembly provides a forward anchor portion, a rearward anchor portion and two sides. The sides are releasably attached the forward anchor end and the rearward anchor end.

According to an embodiment of the integral soft top conversion, the forward anchor portion further provides an underside channel sized to receive and be locked onto a top portion of an automobile windscreen frame beginning at a front boundary of the open space above the driver and passenger seats of the automobile by two latch insert assemblies within the forward portion underside channel connecting to existing attachment points for the OEM removable fitted hard top cover.

According to an embodiment of the integral soft top conversion assembly, the rearward anchor portion further provides an underside channel sized to receive and be secured onto a top portion of an automobile roof beginning at a rear boundary of the open space above the driver and passenger seats of the automobile. The rearward anchor portion further provides mating locator pins on either side of a centered a latching assembly securing the detachable frame assembly to the rear roof support of the automobile connecting to existing attachment points for the OEM removable fitted hard top cover.

According to an embodiment of the integral soft top conversion assembly, attachment assemblies releasably secure the sides to the forward anchor portion and rearward anchor portion near each detachable frame rectangular corner.

According to an embodiment of the integral soft top conversion assembly, a soft top cover is affixed to a forward anchor portion and rearward anchor portion. The soft top cover is sized to cover the assembled rectangular detachable frame assembly.

According to an embodiment of the integral soft top conversion assembly, the frame sides further provide an attachment assembly on at each side mid-point on the inside face of each frame side, to secure a flexible stabilizing bar to support and secure the integral soft top, and channels running the underside length of each frame sized to receive the top portion of a respective side closed windshield of the automobile.

Embodiments of the integral soft top conversion assembly include a flexible stabilizing bar sized to be inserted into the frame side attachment assemblies midway on the inside face of each frame side.

Embodiments of the integral soft top conversion assembly include a protective storage bag sized to receive and store the disassembled soft top conversion assembly in a storage compartment of the automobile, or in any other suitable location in the automobile.

BRIEF DESCRIPTION OF DRAWINGS

These and other features, aspects, and advantages of the soft top conversion assemblies will become better understood regarding the following description, and drawings as further described.

BEST MODE FOR CONDUCTING THE INVENTION

Figure 1:
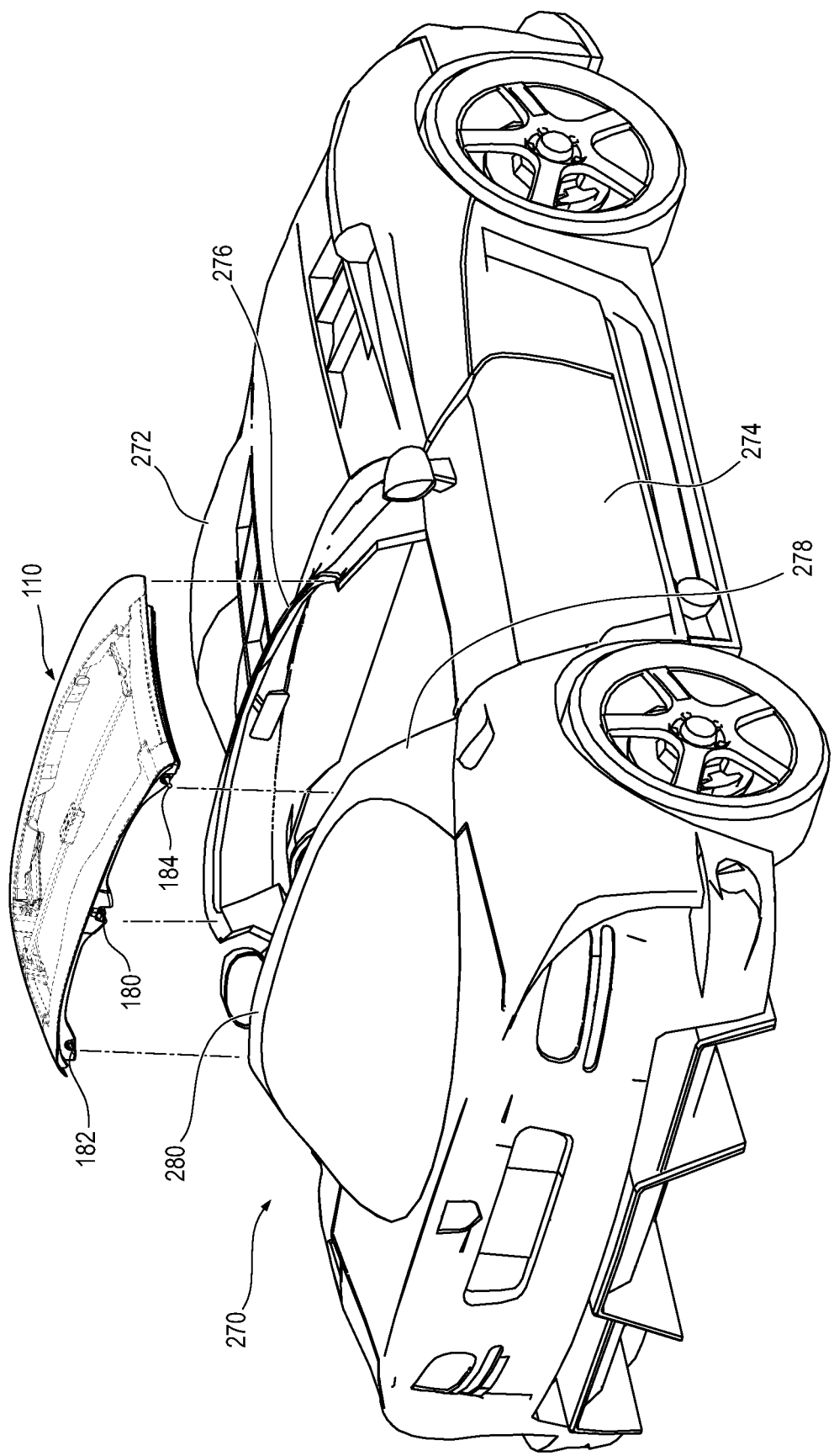
FIG. 1 is a top right rear perspective view of an embodiment of a soft top conversion assembly 110 positioned to be fitted into the open space above the driver seat and the passenger seat of the automobile 270.

Embodiments of the disclosed soft top conversion assembly 110, and systems and methods of use, are depicted in FIGS. 1-13.

An embodiment of the soft top conversion assembly 110 to be fitted onto the open space above the driver and passenger seats of the automobile 270 includes the rectangular detachable frame assembly 120 providing four detachable frame corners, the front anchor portion 122 providing the front anchor left end 124 and the front anchor right end 126, FIGS. 4-11. The rear anchor portion 132 provides the rear anchor left end 134 and the rear anchor right end 136. The left side portion 140 provides the left side portion front end 142 and the left side portion rear end 144. The right side portion 150 provides the right side portion front end 152 and the right side portion rear end 154. The left side portion front end 142 is releasably attached to the front anchor left end 124 and the left side portion rear end 144 is releasably attached to the rear anchor left end 134. The right side front end 152 is releasably attached to the front anchor right end 126 and the right side rear end 154 is releasably attached to the rear anchor right end 136, FIGS. 8-11.

The front anchor portion 122 further provides an underside channel sized to receive and be locked onto the top portion of an automobile 270 front windscreen frame 276 beginning at a front boundary of the open space above the driver and passenger seats of the automobile by a left latch insert assembly 170 and a right latch insert assembly 172 affixed to the front anchor portion 122 underside channel by fastener assemblies 174 and 176, respectively, FIGS. 1, 2, 9-11, fitting into existing OEM attachment points for a removable fitted hard top. The front anchor portion 122 provides a front anchor left end housing 146 and a second front anchor right end housing 148 to facilitate assembly to the left side portion 140 and the right side portion 150, FIGS. 9-11.

The rear anchor portion 132 further provides an underside channel sized to receive and be locked into the top portion of an automobile rear window and roof assembly 278 beginning at a rear boundary 280 of the open space above the driver and passenger seats of the automobile 270 by an attached latch assembly 180 centered on the rear anchor portion fitting into existing OEM attachment points for a removable fitted hard top. The left pin 182 and the right pin 184 are equidistant from and attached by threaded backings, 186 and 188, respectively, on each side of the latch assembly 180, and are sized to be inserted into existing OEM portal openings for a removable fitted hard top in the rear boundary 280 to stabilize and secure the soft top conversion assembly 110 to the automobile rear window and roof assembly 278, FIGS. 1, 2, 6B and 6C. The rear anchor portion 132 further provides a rear anchor left end housing 156, and a rear anchor right end housing 158 to facilitate assembly to the left side portion 140 and the right side portion 150, FIGS. 9-11.

Figure 10:
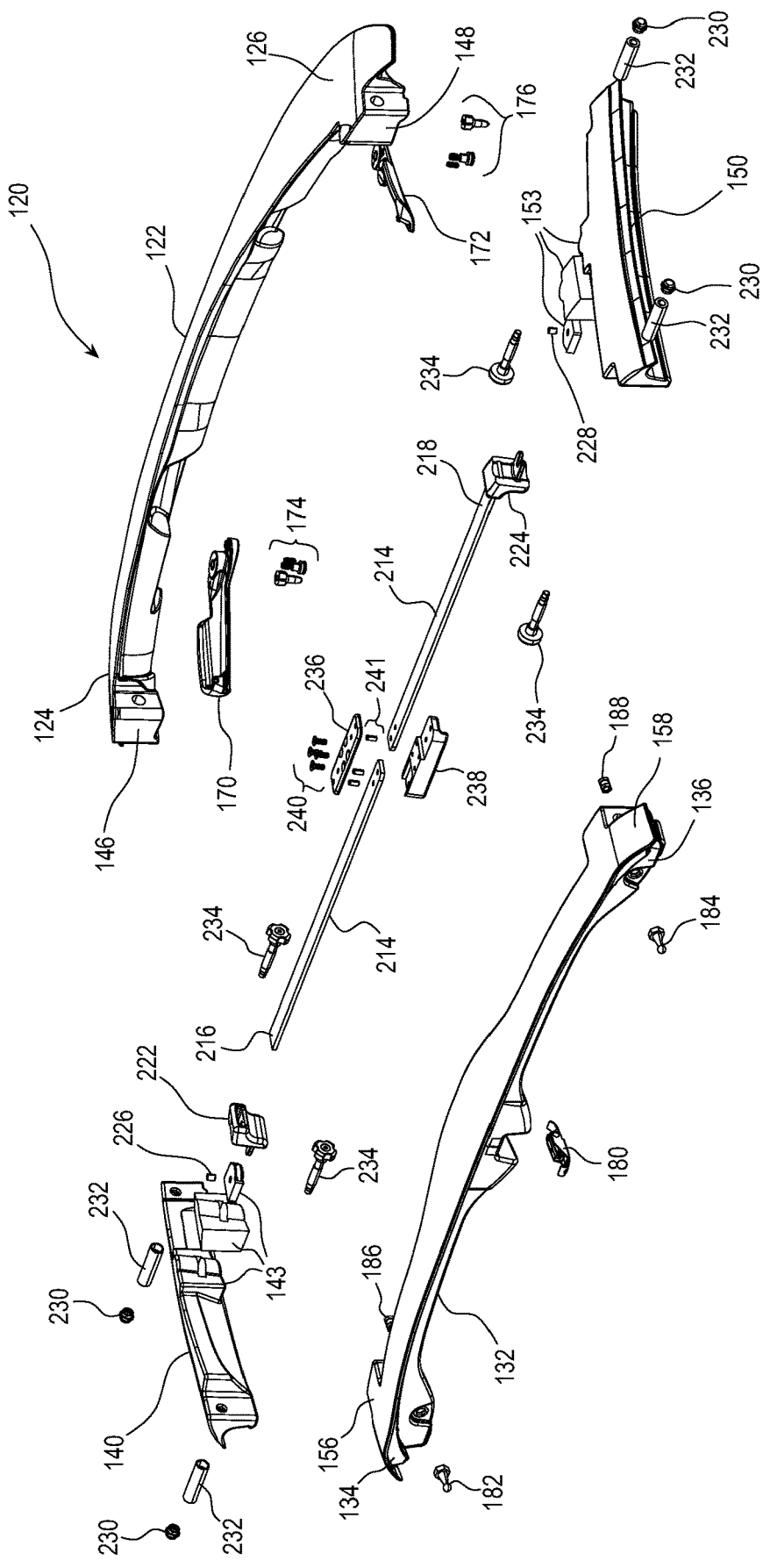
FIG. 10 depicts an exploded, top right rear perspective view of the rectangular detachable frame assembly 120 for the embodiment of a soft top conversion assembly 110 of FIG. 4.
Figure 11:
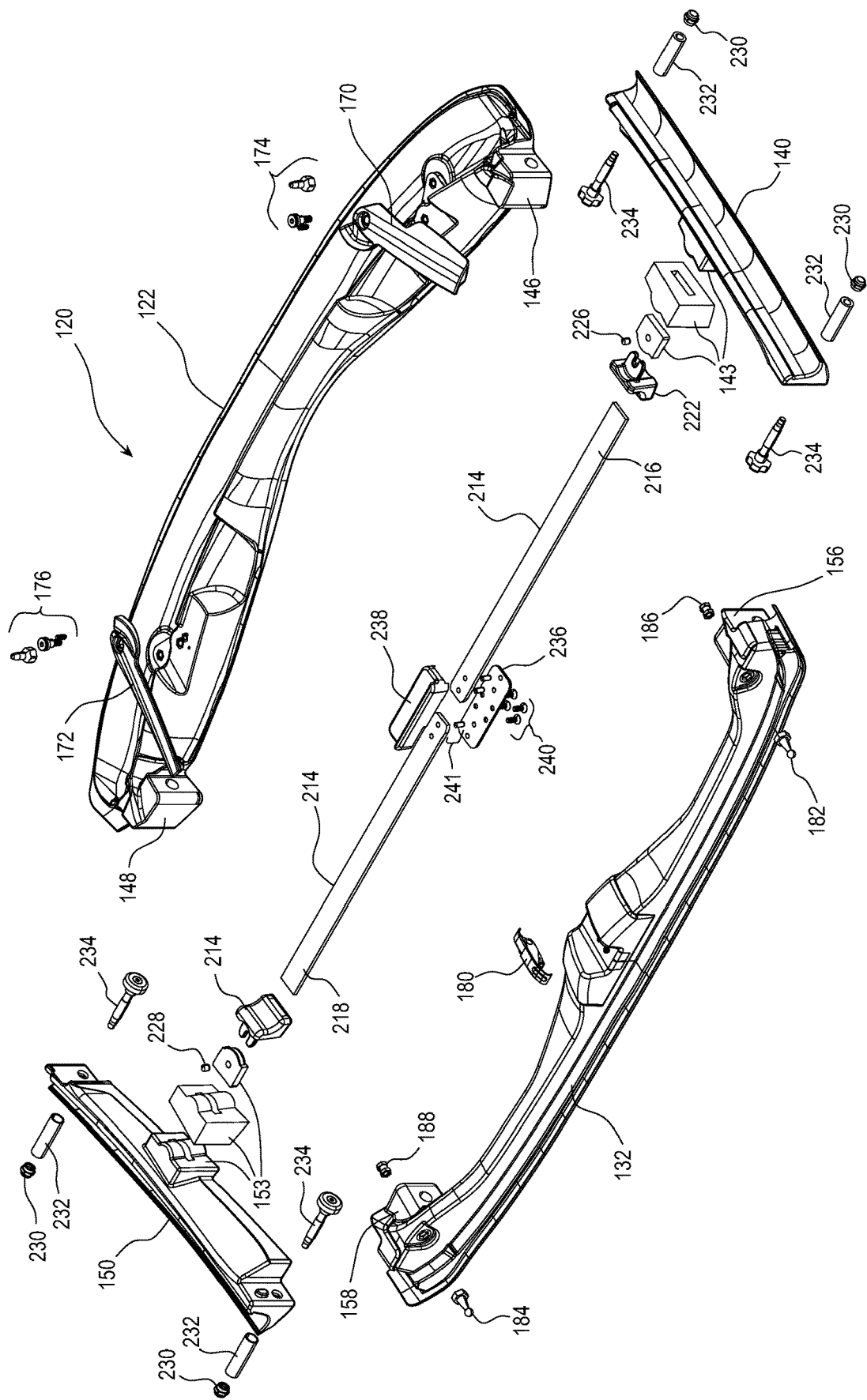
FIG. 11 depicts an exploded, bottom left rear perspective view of the rectangular detachable frame assembly 120 for the embodiment of a soft top conversion assembly 110 of FIG. 4.

Attachment assemblies are provided to releasably secure the left side portion 140 to the front anchor left end housing 146 and the rear anchor left end housing 156, and to releasably secure the right side portion 150 to the front anchor right end housing 148 and the rear anchor right end housing 158 near each respective detachable frame rectangular corner, FIGS. 10 and 11. These attachment assemblies further support the attached soft top cover 190 bottom side extending the soft top cover beyond the left side portion 140 and the right side portion 150 of the rectangular detachable frame, FIGS. 3-4, and 8. Each respective front anchor left end housing 146, rear anchor left end housing 156, front anchor right end housing 148, and rear anchor right end housing 158 facilitate the orientation of connection apertures for the frame component attachment assemblies of each respective detachable frame rectangular corner. For an embodiment of the soft top conversion assembly 110 these attachment assemblies include the side portion threaded receptor 230, the side portion extender 232, and the side portion threaded connector bold 234, FIGS. 10 and 11. The side portion threaded connector bolt 234 provides a circular, enlarged bolt head easily grasped between a user's thumb and index finger to connect each left side portion 140 and right side portion 150 to the respective front anchor left end housing 146 and the rear anchor left end housing 156 and the respective front anchor right end housing 148 and the rear anchor right end housing 158 near each respective detachable frame rectangular corner.

Figure 2:
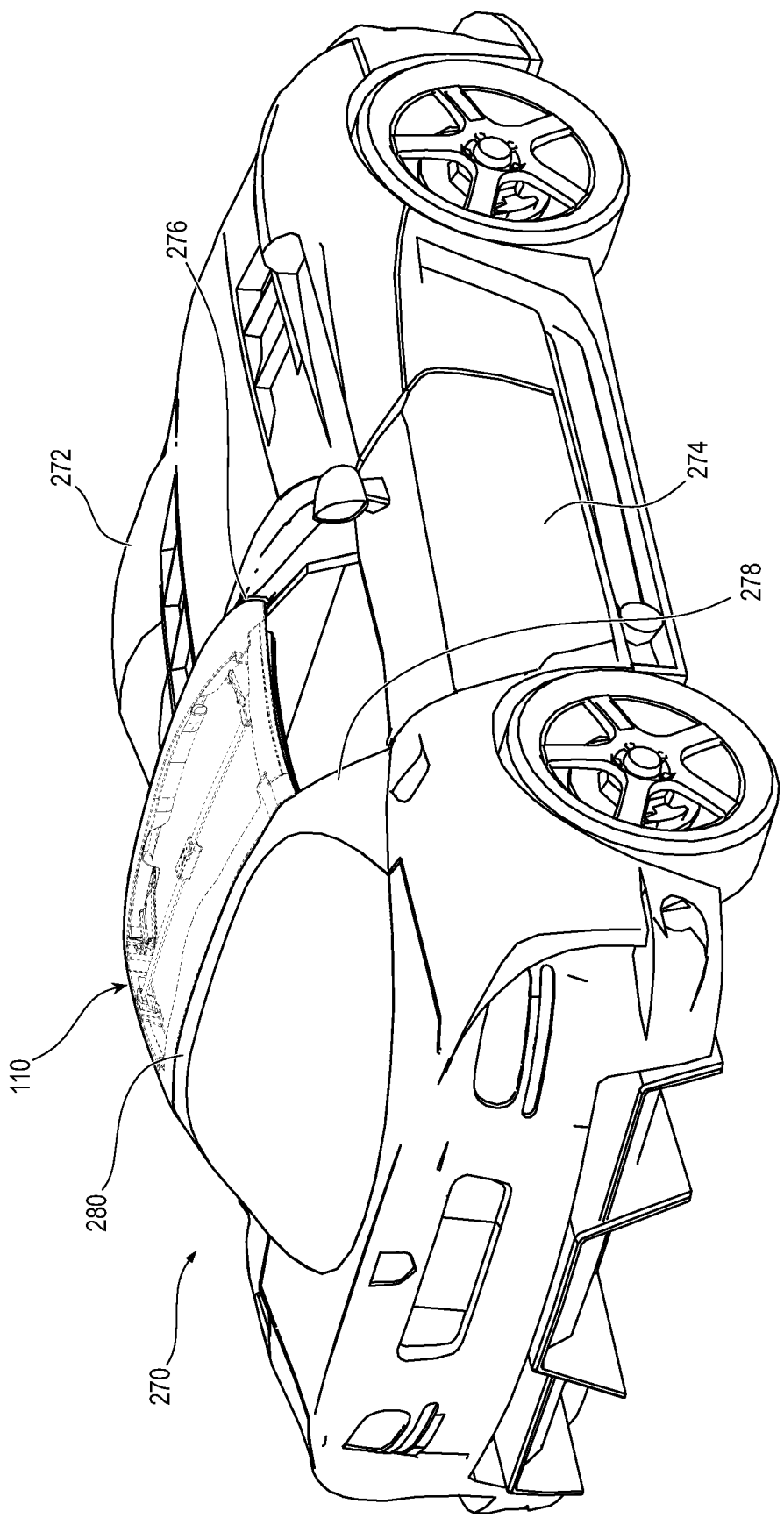
FIG. 2 is the perspective view of FIG. 1 depicting an embodiment of a soft top conversion assembly 110 fitted into the open space above the driver seat and a passenger seat of the automobile 270.
Figure 3:
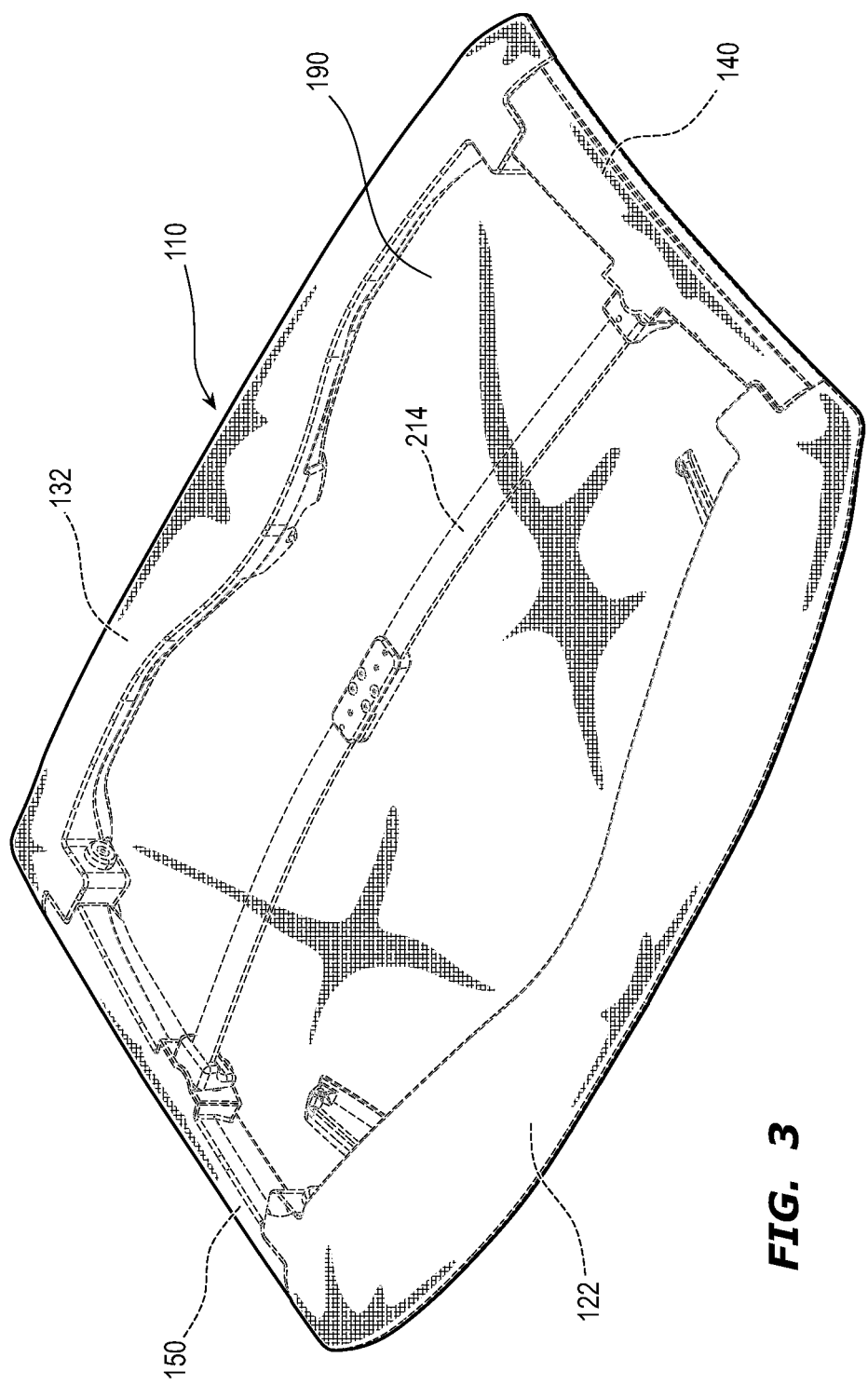
FIG. 3 is a top right front perspective view of an embodiment of a soft top conversion assembly 110.
Figure 4:
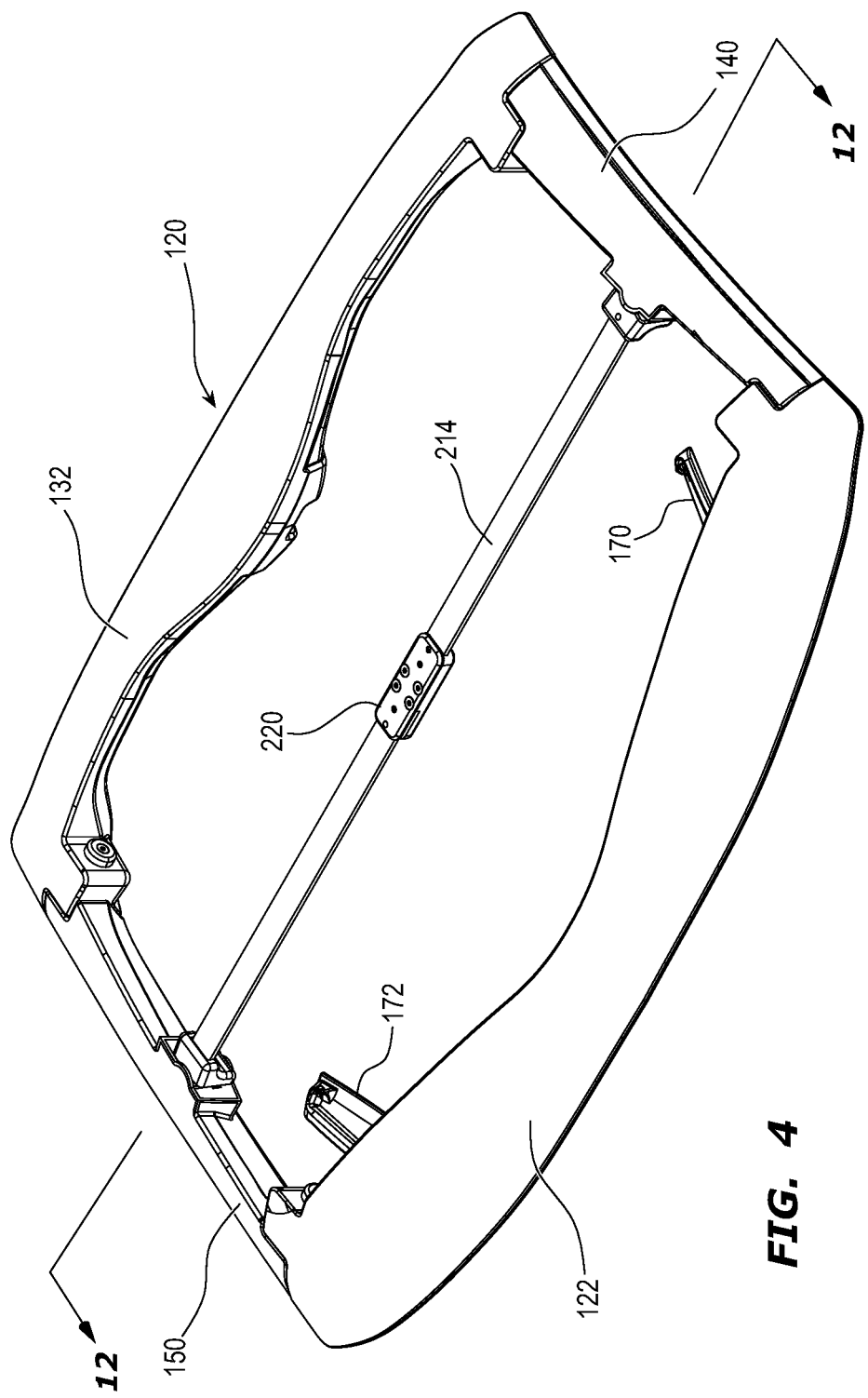
FIG. 4 is the top right front perspective view of the rectangular detachable frame assembly 120 for the embodiment of a soft top conversion assembly 110 of FIG. 3 with the soft top cover removed 190.

A soft top cover 190 includes a bottom side, a top side, a left side surface, and a right side surface, FIGS. 1-3. The top cover 190 bottom side front end is adhesively affixed to the front anchor portion 122 top surface. The top cover 190 bottom side rear end is adhesively affixed to the rear anchor portion 132 top surface. The top cover 190 is sized to cover the rectangular detachable frame assembly 120. The soft top cover 190 is manufactured from materials that provide UV protection and water resistance.

Figure 5:
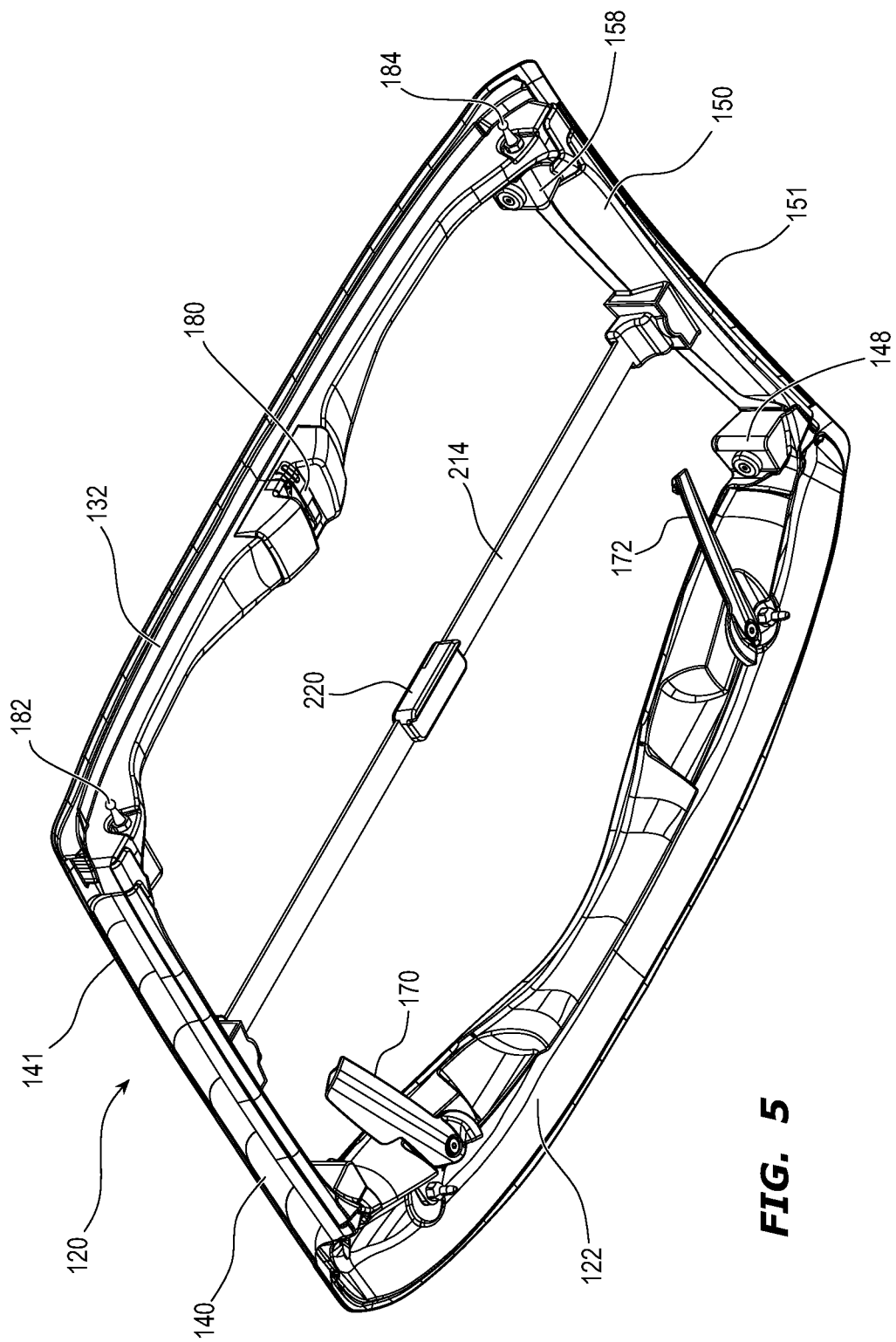
FIG. 5 is bottom left rear perspective view depicting the embodiment of a soft top conversion assembly 110 of FIG. 4.
Figures 12, 13:
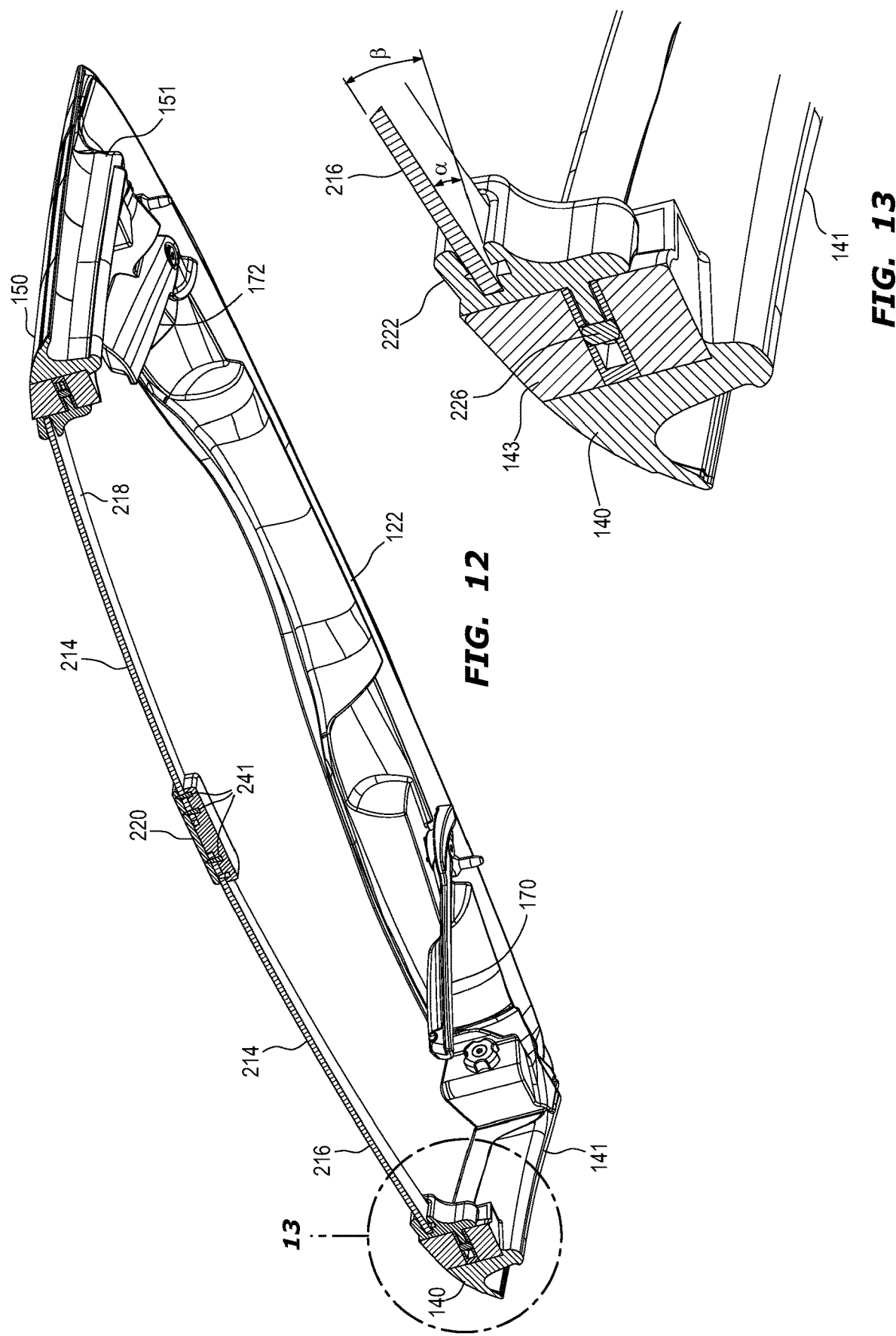
FIG. 12 depicts a right rear perspective cross-sectional view of FIG. 4 taken at "12-12."
FIG. 13 depicts perspective detail of FIG. 12 taken at "13" depicting a first angle α of the left stabilizing bar 216 when the left stabilizing bar 216 is flexed forwards at the pivot point 220 and a second angle β when the left stabilizing bar 216 is returned to longitudinal alignment with the right stabilizing bar 218 through the pivot point 220 giving a slight upwards bow to the stabilizing bar 214.

The left side portion 140 and the right side portion 150 further include a channel, 141 and 151, respectively, running the length of an underside of the left side portion 140 and the right side portion 150, FIGS. 5, 12 and 13. The left side portion channel 141 is sized to receive the top portion of a closed windshield of the automobile for a left side door. The right side portion channel 151 is sized to receive the top portion of a closed windshield of the automobile for a right side door. The left side portion 140 provides an attachment assembly 143 at the mid-point of the left side portion 140 inside face, FIGS. 10-13. The right side portion 150 provides an attachment assembly 153 at a mid-point of a right side portion 150 inside face.

A flexible stabilizing bar 214 is sized to be fitted between the attachment assembly 143 at the mid-point of the left side portion 140 inside face and the attachment assembly 153 at the mid-point right of the right side portion 150 inside face and provides a stabilizing bar left end 216 and a stabilizing bar right end 218, FIGS. 4-13. The stabilizing bar left end prong 222 is sized to be received and releasably attached onto the stabilizing bar left end dowl 226 inside attachment assembly 143. The stabilizing bar right end prong 224 is sized to be received and releasably attached onto the stabilizing bar right end dowl 228 inside attachment assembly 153. Central flexible stabilizing bar ends are attached at a central pivot point 220 by pivot pins 241 secured by the top housing 236 and the bottom housing 238, such that one central stabilizing bar end can hinge on a pivot pin 241 within the pivot point 220, FIGS. 10 and 11. Rivets 240 fixedly secure the top housing 236 to the bottom housing 238 at the pivot point 220, providing clearance spacing for the central stabilizing bar end can hinge on a pivot pin 241 providing space for each stabilizing bar attachment end to adjust its respective attachment assembly dowl. Once attached to the stabilizing bar left end dowl 226 and the stabilizing bar right end dowl 228, the stabilizing bar 214 folds inward around the stabilizing bar central pivot point 220 providing a first deflection angle α, FIG. 13, at each stabilizing bar left and right attached end. Alignment of the stabilizing bar left end 216 and the stabilizing bar right end into a straight configuration at the central pivot point 220 provides a second deflection angle β, FIG. 13, at each stabilizing bar left and right attached end, and causes the flexible stabilizing bar 214 to bow slightly upwards contacting the soft top cover 190 bottom side to support and stabilize the soft top cover 190, FIGS. 4, 12-13. The stabilizing bar 214 for an embodiment of the soft top conversion assembly 110 is fiberglass.

A protective bag (not depicted) is sized to receive and protect the detached and disassembled and rolled up soft top conversion assembly 110 components when placed into the automobile storage area (not depicted).

The forward anchor portion 122, the rearward anchor portion 132, and the frame sides 140 and 150, respectively, for an embodiment of a soft top assembly 110 are manufactured from rolled polylactic acid, a bioplastic.

An embodiment for a system of a soft top conversion 110 to be fitted onto the open space above the driver and passenger seats of the automobile 270 includes a rectangular detachable frame assembly 120 sized to be releasably attached to existing attachment points for the OEM removable fitted hard top cover in the front window frame 276 and the rear boundary 280 of the automobile rear window and roof assembly 278, FIGS. 1-4.

An embodiment for a system of a soft top conversion 110 to be fitted onto the open space above the driver and passenger seats of the automobile 270 further includes a soft top cover 190 sized to cover the open space above the driver seat and the passenger seat of the automobile 270 and fixedly attached to the front anchor portion 122 of the detachable frame assembly 120 and fixedly attached to the rear anchor portion 132 of the detachable frame assembly 120, FIGS. 1-12.

An embodiment for a system of a soft top conversion 110 to be fitted onto the open space above the driver and passenger seats of the automobile 270 further includes the left side portion 140 releasably affixed to the front anchor portion left end 124 and a rear anchor portion left end 134, FIGS. 5-12.

An embodiment for a system of a soft top conversion 110 to be fitted onto the open space above the driver and passenger seats of the automobile 270 further includes the right side portion 150 releasably affixed to the front anchor portion right end 126 and a rear anchor portion right end 136, FIGS. 5-12.

An embodiment for a system of a soft top conversion 110 to be fitted onto the open space above the driver and passenger seats of the automobile 270 further includes the flexible stabilizing bar 214 sized to be fitted between the releasably affixed left side portion 140 and the releasably affixed right side portion 150, the flexible stabilizing bar 214 providing the stabilizing bar left end 216 and the stabilizing bar right end 218, FIGS. 4-13. The stabilizing bar left end prong 222 is sized to be received and releasably attached onto the stabilizing bar left end dowl 226 and the stabilizing bar right end prong 224 is sized to be received and releasably attached onto the stabilizing bar right end dowl 228, FIGS.

10-13. In this configuration, the stabilizing bar left end 216 and the stabilizing bar right 218 end fold inward around the stabilizing bar central pivot point 220. Alignment of the stabilizing bar left end 216 and the stabilizing bar right end 218 into the straight configuration of the entire stabilizing bar 214 regarding the central pivot point 220 causes the flexible stabilizing bar 214 to bow upwards, contacting the soft top cover 190 bottom side, supporting and stabilizing the soft top cover 190, FIGS. 12 and 13.

An embodiment for a system of a soft top conversion 110 to be fitted onto the open space above the driver and passenger seats of the automobile 270 further provides the detachable frame front anchor portion 122, the rear anchor portion 132, the left side portion 140, and the right side portion 150 manufactured from rolled polylactic acid, a bioplastic.

An embodiment for a system of a soft top conversion 110 to be fitted onto the open space above the driver and passenger seats of the automobile 270 further provides the left side portion 140 and the right side portion 150 with channels, 141 and 151 respectively, running the underside length of each side portion sized to receive the top portion of a closed door windshield corresponding to the respective side of the automobile.

An embodiment for a soft top conversion 110 system to be fitted onto the open space above the driver and passenger seats of the automobile 270 further provides the soft top cover 190 manufactured from materials that provide UV protection and water resistance.

Figure 6A:
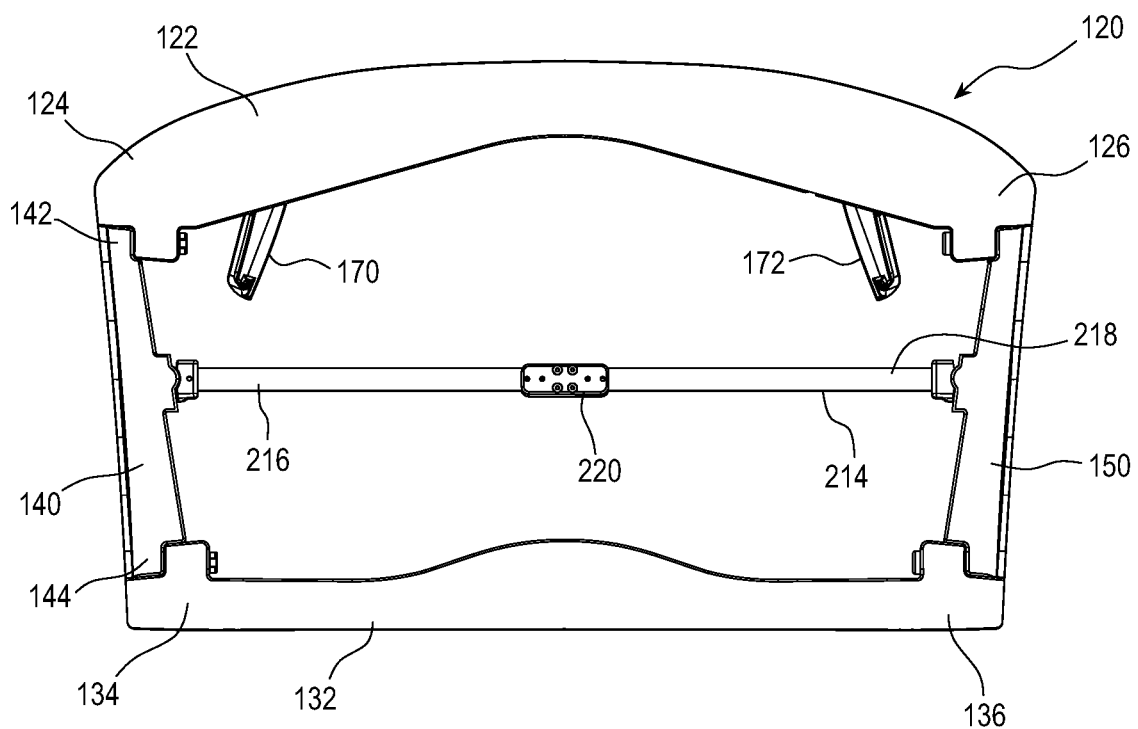
FIG. 6A a top plan view depicting the embodiment of a soft top conversion assembly 110 of FIG. 4.
Figure 6B:
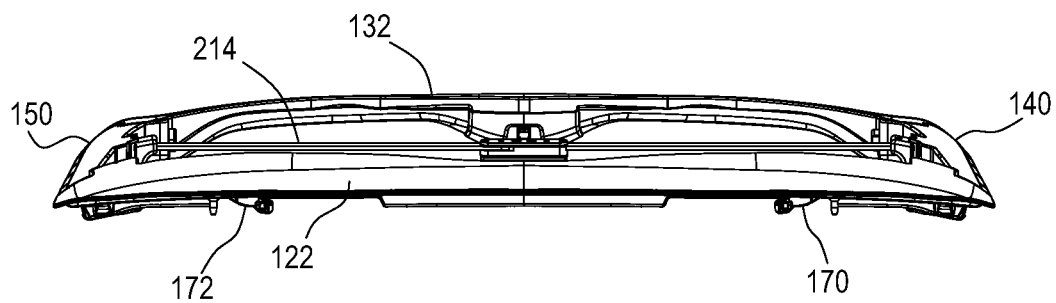
FIG. 6B is a front elevation view of the embodiment of a soft top conversion assembly 110 of FIG. 4.
Figure 6C:
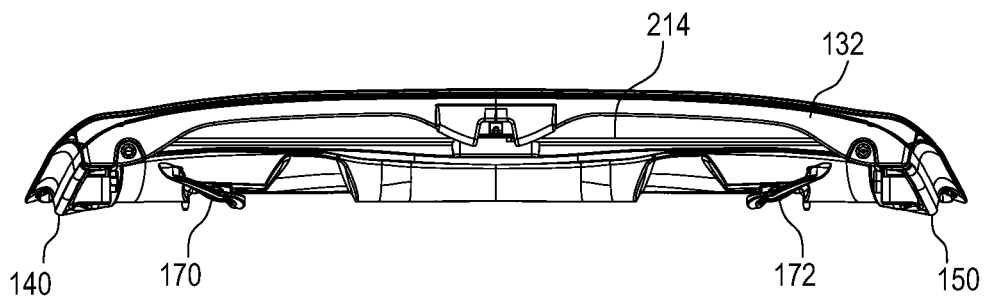
FIG. 6C is a rear elevation view of the embodiment of a soft top conversion assembly 110 of FIG. 4.
Figure 7A:
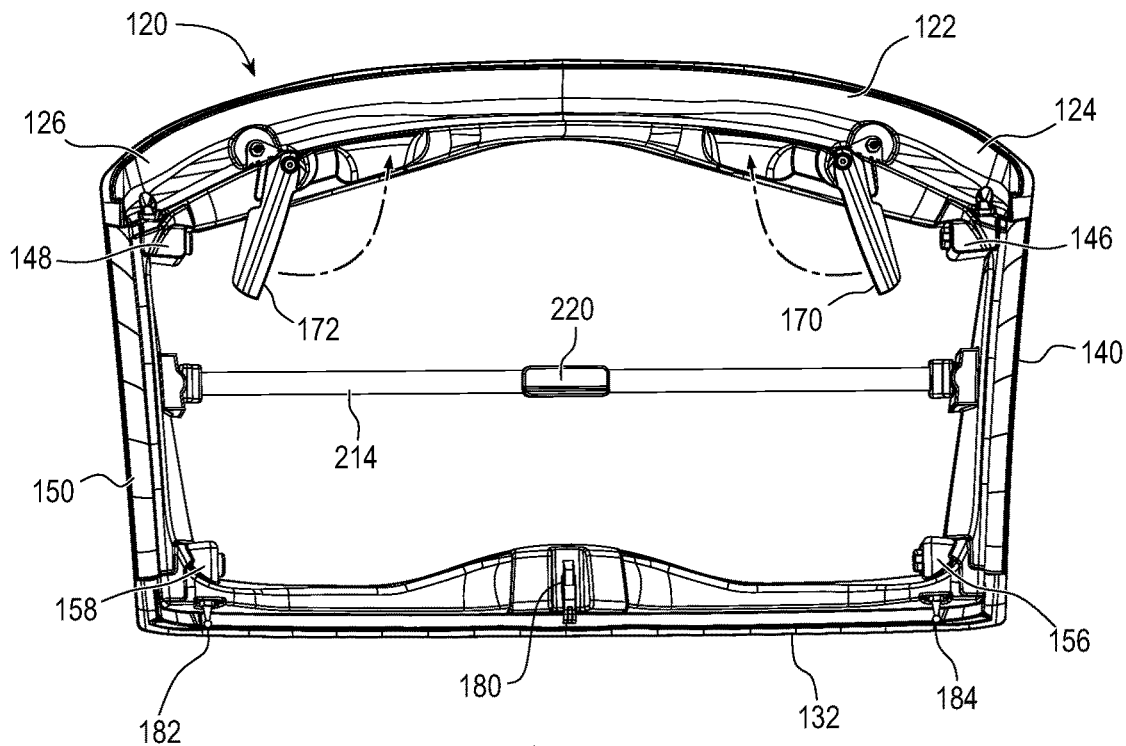
FIG. 7A depicts a bottom plan view depicting the embodiment of a soft top conversion assembly 110 of FIG. 1 with front anchor locking latch arm attachment assemblies 170 and 172 disengaged from front windscreen frame 276.
Figure 7B:
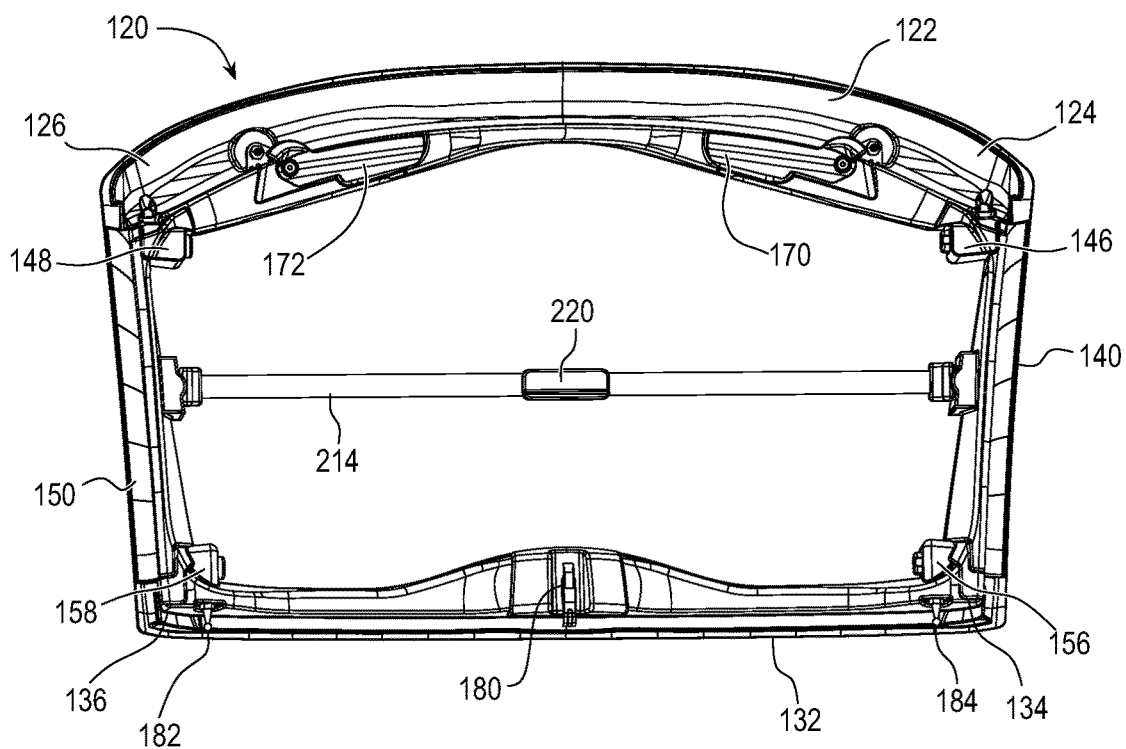
FIG. 7B depicts a bottom plan view depicting the embodiment of a soft top conversion assembly 110 of FIG. 1 with front anchor locking latch arm attachment assemblies 170 and 172 engaged with front windscreen frame 276.
Figure 8:
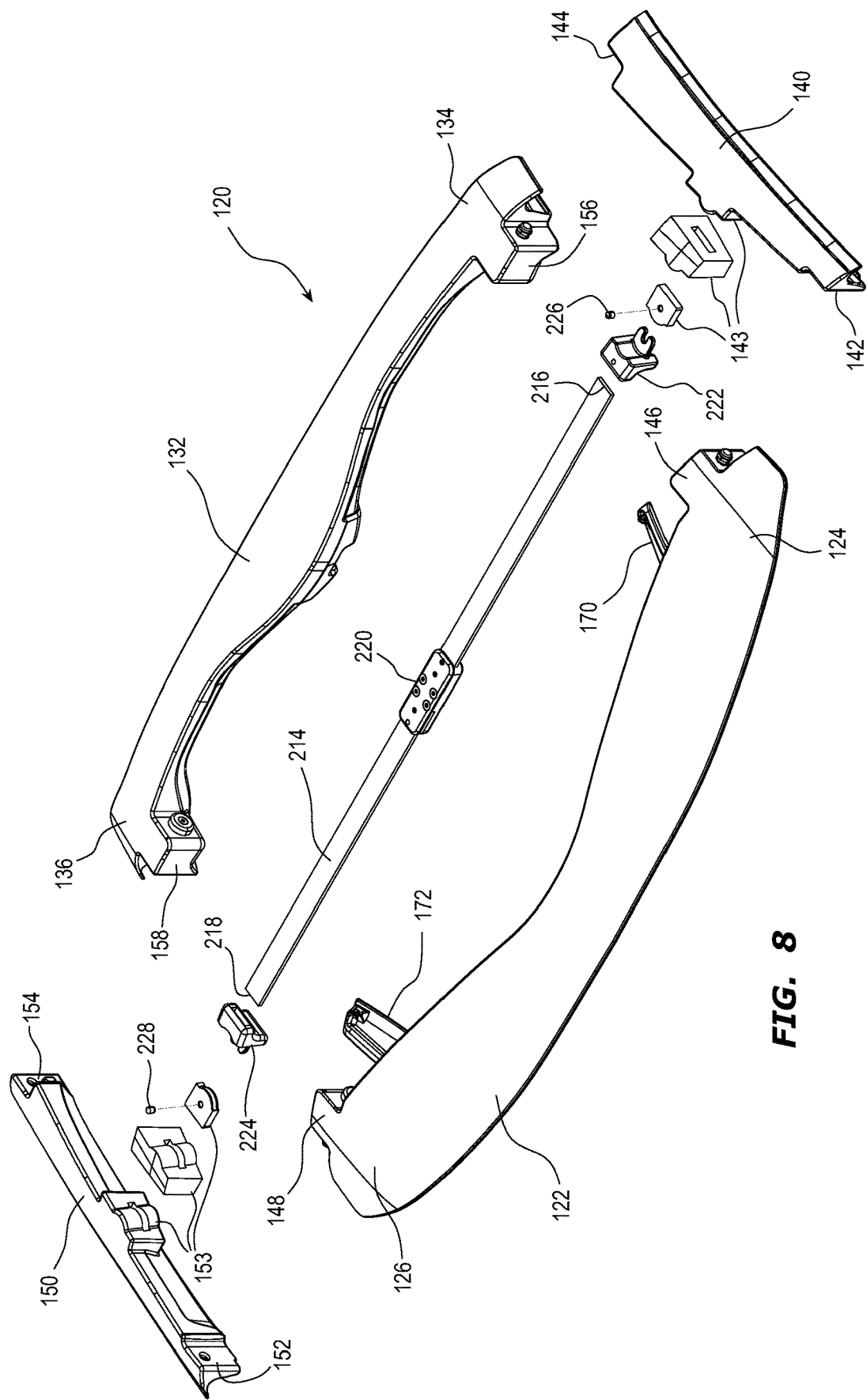
FIG. 8 depicts an exploded, top right front perspective view of the rectangular detachable frame assembly 120 for the embodiment of a soft top conversion assembly 110 of FIG. 4.
Figure 9:
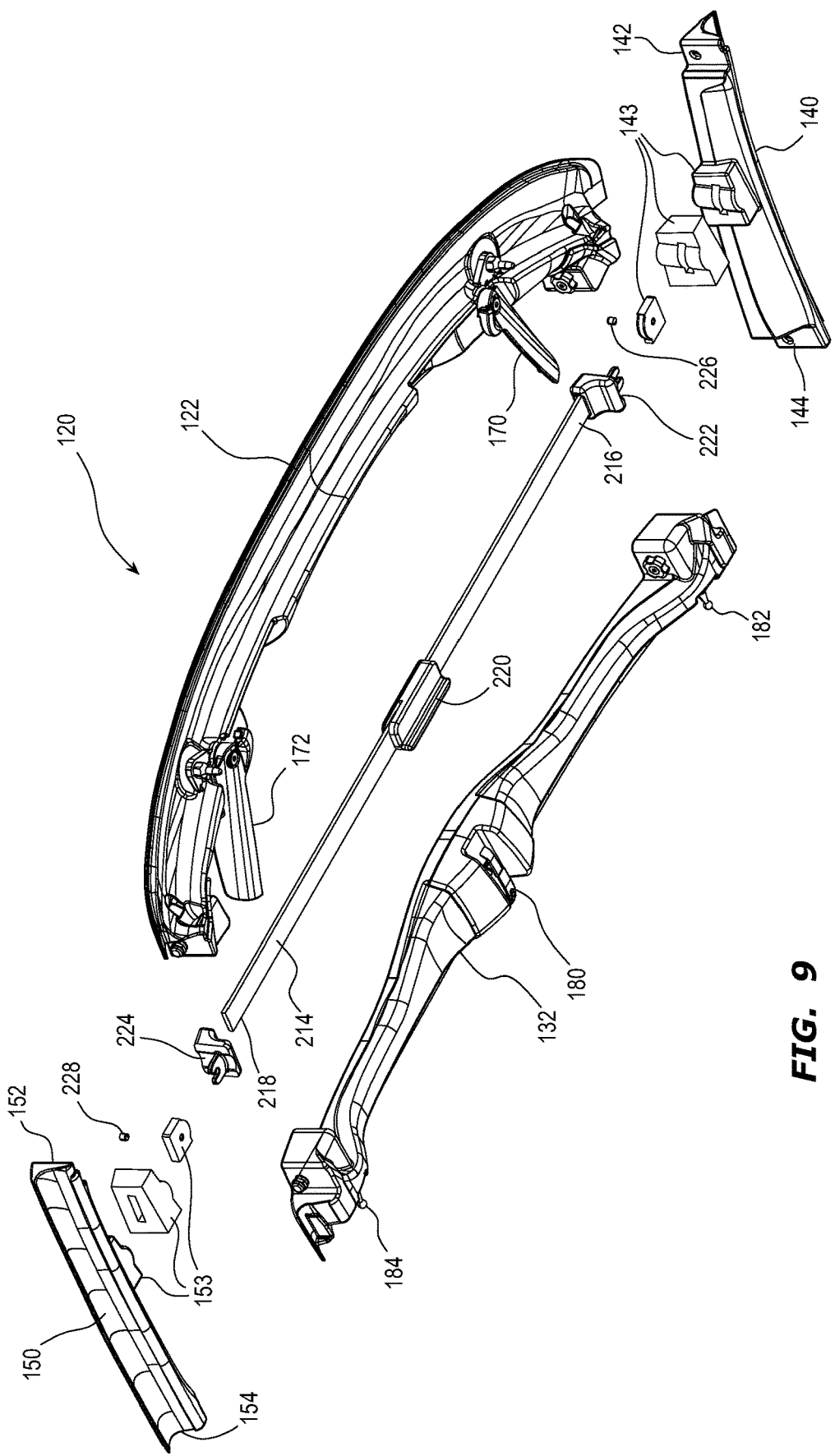
FIG. 9 depicts an exploded, bottom right front perspective view of the αrectangular detachable frame assembly 120 for the embodiment of a soft top conversion assembly 110 of FIG. 4.

In some aspects, the techniques described relate to a soft top conversion system to be fitted onto an open space above a driver seat and a passenger seat of an automobile, the soft top conversion system including, in combination:

A) providing the rectangular detachable frame assembly 110 sized to be releasably attached to existing attachment points for an OEM removable fitted hard top cover in the front windscreen frame 276 and the rear boundary 280 of the open space above the driver seat and the passenger seat of the automobile 270, FIGS. 1 and 2;

B) the soft top cover 190 sized to cover the open space above the driver seat and the passenger seat of the automobile and fixedly attached to the front anchor portion 122 top surface of the rectangular detachable frame assembly 120 and fixedly attached to the rear anchor portion 132 top surface of the detachable frame assembly 120, FIG. 3;

C) the left side portion 140 releasably affixed to a front anchor portion left corner 124 and a rear anchor portion left corner 134, FIG. 6A;

D) the right side portion 150 releasably affixed to a front anchor portion right corner 126 and a rear anchor portion right corner 136, FIG. 6A; and E) the flexible fiberglass stabilizing bar 214 sized to be fitted between the releasably affixed left side portion 140 and the releasably affixed right side portion 150, the flexible stabilizing bar 214 comprising the stabilizing bar left end 216 and the stabilizing bar right end 218, the stabilizing bar left end prong 222 sized to be received and releasably attached onto the stabilizing bar left end dowl 226, the stabilizing bar right end prong 218 sized to be received and releasably attached onto the stabilizing bar right end dowl 228, whereby the stabilizing bar 214 folds inward around the stabilizing bar central pivot point 220, and whereby alignment of the stabilizing bar left end 216 and the stabilizing bar right end 218 into the straight configuration regarding the central pivot point 220 causes the flexible stabilizing bar to bow upwards, contacting the soft top cover bottom side, and supporting and stabilizing the soft top cover, FIGS. 3, 9-13.

In some aspects, the techniques described relate to a method of use for a soft top conversion 110 to be fitted onto an open space above the driver and passenger seats of an automobile 270 includes at least these steps:

A) providing an embodiment of the assembly or system for a system of the soft top conversion 110 to be fitted onto the open space above the driver and passenger seats of the automobile 270 of paragraphs through of this disclosure;

B) removing the front anchor portion 122 and the rear anchor portion 132 with the attached soft top cover 190 bottom side attached to the top side surfaces of the front anchor portion 122 and the rear anchor portion 132;

C) affixing the front anchor portion 122 to the top portion of an automobile 270 front windscreen frame 276 by engaging the front anchor left locking latch arm 170 and the front anchor right locking latch arm 172 with the OEM attachment points for a removable fitted hard top;

D) affixing the rear anchor portion 132 to the top portion of an automobile rear window and roof assembly 278 beginning at a rear boundary 280 of the open space above the driver and passenger seats of the automobile 270 by attaching the rear anchor latch assembly 180 centered on the rear anchor portion fitting into the existing OEM attachment point for a removable fitted hard top, and inserting the rear anchor portion left pin 182 and right pin 184 are into existing OEM portal openings for a removable fitted hard top in the rear boundary 280;

E) attaching the left side portion front end 142 to the front anchor left end 124 and attaching the left side portion rear end 144 to the rear anchor left end 134 with provided threaded fasteners;

F) attaching the right side portion front end 152 to the front anchor right end 126 and attaching the right side rear end 154 to the rear anchor right end 136 with provided threaded fasteners;

G) attaching stabilizing bar left end prong 222 onto the stabilizing bar left end dowl 226 and attaching the stabilizing bar right end prong 224 onto the stabilizing bar right end dowl 228 providing an inwards folding of the stabilizing bar 214 around the stabilizing bar central pivot point 220; and H) aligning the stabilizing bar left end 216 and the stabilizing bar right end into a straight configuration in relation to the central pivot point 220 causing the flexible stabilizing bar 214 to bow slightly upwards contacting the soft top cover 190 bottom side and supporting and stabilizing the soft top cover 190.

We claim:

1. A soft top conversion assembly to be fitted onto an open space above a driver seat and a passenger seat of an automobile, the soft top conversion assembly comprising in combination:

A) a rectangular detachable frame assembly comprising four detachable frame corners, a front anchor portion comprising a front anchor left end and a front anchor right end, a rear anchor portion comprising a rear anchor left end and a rear anchor right end, a left side portion comprising a left side portion front end and a left side portion rear end, and a right side portion comprising a right side portion front end and a right side portion rear end, wherein the left side portion front end is releasably attached to the front anchor left end and the left side portion rear end is releasably attached to the rear anchor left end and the right side front end is releasably attached to the front anchor right end and the right side rear end is releasably attached to the rear anchor right end;

B) the front anchor portion further comprising an underside channel sized to receive and be locked onto a top portion of an automobile front windscreen frame beginning at a front boundary of the open space above the driver and passenger seats of the automobile by a left latch insert assembly and a right latch insert assembly within the front portion underside channel, a front anchor left end housing, and a second front anchor right end housing;

C) the rear anchor portion further comprising an underside channel sized to receive and be locked into a top portion of an automobile rear window and roof assembly beginning at a rear boundary of the open space above the driver and passenger seats of the automobile by a latch assembly centered on the rear anchor portion and a left pin insert and a right pin insert equidistant from the latch assembly and on each side of the latch assembly, a rear anchor left end housing, and a rear anchor right end housing;

D) attachment assemblies to releasably secure the left side portion to the front anchor left end housing and the rear anchor left end housing, and releasably secure the right side portion to the front anchor right end housing and the rear anchor right end housing near each respective detachable frame rectangular corner;

E) a soft top cover comprising a bottom side, and a top side, wherein a top cover bottom side front end is affixed to a front anchor portion top surface, including a front anchor left end housing top surface and a front anchor right end housing top surface, and a top cover bottom side rear end is affixed to a rear anchor portion top surface, including a rear anchor left end housing top surface, and a rear anchor right end housing top surface, whereby the top cover is sized to cover the rectangular detachable frame assembly;

F) a flexible stabilizing bar sized to be fitted between the left side portion and the right side portion, the flexible stabilizing bar comprising a stabilizing bar left end and a stabilizing bar right end, a stabilizing bar left end prong sized to be received and releasably attached onto a stabilizing bar left end dowl, a stabilizing bar right end prong sized to be received and releasably attached onto a stabilizing bar right end dowl, whereby the stabilizing bar folds inward around a stabilizing bar central pivot point, and whereby alignment of the stabilizing bar left end and the stabilizing bar right end into a straight configuration regarding the central pivot point causes the flexible stabilizing bar to bow upwards, contacting the soft top cover bottom side, and supporting and stabilizing the soft top cover.

2. The soft top conversion assembly of claim 1, wherein the left side portion and the right side portion further comprise (i) a channel running the length of an underside of the left side portion and the right side portion, the left side portion channel sized to receive the top portion of a closed windshield of the automobile for a left side door and the right side portion channel sized to receive the top portion of a closed windshield of the automobile for a right side door, and (ii) a left side portion attachment assembly at a mid-point of a left side portion inside face and a right side portion attachment assembly at a mid-point of a right side portion inside face.

3. The soft top conversion assembly of claim 1, wherein the detachable frame front anchor portion, the rear anchor portion, the left side portion, and the right side portion comprise rolled polylactic acid, a bioplastic.

4. The soft top conversion assembly of claim 1, wherein the soft top cover is manufactured from materials that provide UV protection and water resistance.

5. A soft, top conversion assembly to be fitted onto an open space above a driver seat and a passenger seat of an automobile, the soft top conversion assembly comprising in combination:

A) a rectangular detachable frame assembly comprising four detachable frame corners, a front anchor portion comprising a front anchor left end and a front anchor right end, a rear anchor portion comprising a rear anchor left end and a rear anchor right end, a left side portion comprising a left side portion front end and a left side portion rear end, and a right side portion comprising a right side portion front end and a right side portion rear end, wherein the left side portion front end is releasably attached to the front anchor left end and the left side portion rear end is releasably attached to the rear anchor left end and the right side front end is releasably attached to the front anchor right end and the right side rear end is releasably attached to the rear anchor right end, wherein the detachable frame front anchor portion, the rear anchor portion, the left side portion, and the right side portion comprise rolled polylactic acid, a bioplastic;

B) the front anchor portion further comprising an underside channel sized to receive and be locked onto a top portion of an automobile front windscreen frame beginning at a front boundary of the open space above the driver and passenger seats of the automobile by a left latch insert assembly and a right latch insert assembly within the front portion underside channel, a front anchor left end housing, and a second front anchor right end housing;

C) the rear anchor portion further comprising an underside channel sized to receive and be locked into a top portion of an automobile rear window and roof assembly beginning at a rear boundary of the open space above the driver and passenger seats of the automobile by a latch assembly centered on the rear anchor portion and a left pin insert and a right pin insert equidistant from the latch assembly and on each side of the latch assembly, a rear anchor left end housing, and a rear anchor right end housing;

D) attachment assemblies to releasably secure the left side portion to the front anchor left end housing and the rear anchor left end housing, and releasably secure the right side portion to the front anchor right end housing and the rear anchor right end housing near each respective detachable frame rectangular corner;

E) a soft top cover manufactured from materials that provide UV protection and water resistance, the soft top cover comprising a bottom side, and a top side, wherein a top cover bottom side front end is adhesively affixed to a front anchor portion top surface, including a front anchor left end housing top surface and a front anchor right end housing top surface, and a top cover bottom side rear end is adhesively affixed to a rear anchor portion top surface, including a rear anchor left end housing top surface, and a rear anchor right end housing top surface, whereby the top cover is sized to cover the rectangular detachable frame assembly;

F) wherein the left side portion and the right side portion further comprise (i) a channel running the length of an underside of the left side portion and the right side portion, the left side portion channel sized to receive the top portion of a closed windshield of the automobile for a left side door and the right side portion channel sized to receive the top portion of a closed windshield of the automobile for a right side door, and (ii) a left side portion attachment assembly at a mid-point of a left side portion inside face and a right side portion attachment assembly at a mid-point of a right side portion inside face; and G) a flexible stabilizing bar sized to be fitted between the left side portion and the right side portion, the flexible stabilizing bar comprising a stabilizing bar left end and a stabilizing bar right end, a stabilizing bar left end prong sized to be received and releasably attached onto a stabilizing bar left end dowl, a stabilizing bar right end prong sized to be received and releasably attached onto a stabilizing bar right end dowl, whereby the stabilizing bar folds inward around a stabilizing bar central pivot point, and whereby alignment of the stabilizing bar left end and the stabilizing bar right end into a straight configuration regarding the central pivot point causes the flexible stabilizing bar to bow upwards, contacting the soft top cover bottom side, and supporting and stabilizing the soft top cover.

6. A soft top conversion system to be fitted onto an open space above a driver seat and a passenger seat of an automobile, the soft top conversion system comprising in combination:

A) a rectangular detachable frame assembly sized to be releasably attached to existing attachment points for an OEM removable fitted hard top cover in front and rear boundaries of the open space above the driver seat and the passenger seat of the automobile;

B) a soft top cover sized to cover the open space above the driver seat and the passenger seat of the automobile and fixedly attached to a front anchor portion of the detachable frame assembly and fixedly attached to a rear anchor portion of the detachable frame assembly;

C) a left side portion comprising a midpoint connector on a left side portion internal side, and releasably affixed to a front anchor portion left corner and a rear anchor portion left corner;

D) a right side portion comprising a midpoint connector on a right side portion internal side, and releasably affixed to a front anchor portion right corner and a rear anchor portion right corner; and E) a flexible fiberglass stabilizing bar sized to be fitted between the releasably affixed left side portion midpoint connector and the releasably affixed right side portion midsized connector, the flexible stabilizing bar comprising a stabilizing bar left end and a stabilizing bar right end, a stabilizing bar left end prong sized to be received and releasably attached onto a stabilizing bar left end dowl, a stabilizing bar right end prong sized to be received and releasably attached onto a stabilizing bar right end dowl, whereby a stabilizing bar left end and a stabilizing bar right end folds inward around a stabilizing bar central pivot point, and whereby alignment of the stabilizing bar left end and the stabilizing bar right end into a straight configuration regarding the central pivot point causes the flexible stabilizing bar to bow upwards, contacting a soft top cover bottom side, and supporting and stabilizing the soft top cover.

7. The system of claim 6, wherein the detachable frame front anchor portion, the rear anchor portion, the left side portion, and the right side portion comprise rolled polylactic acid, a bioplastic.

8. The system of claim 7, wherein the left side portion and the right side portion comprise channels running the underside length of each side portion sized to receive the top portion of a closed door windshield corresponding to the respective side of the automobile.

9. The system of claim 8, wherein the soft top cover is manufactured from materials that provide UV protection and water resistance.

10. A method of use for a soft top conversion to be fitted onto an open space above a driver seat and a passenger seat of an automobile, the method comprising the steps:

A) providing the system of claim 9;

B) removing the front anchor portion and the rear anchor portion with the attached soft top cover bottom side attached to the top side surfaces of the front anchor portion and the rear anchor portion;

C) affixing the front anchor portion to a top portion of an automobile front windscreen frame by engaging a front anchor left locking latch arm and by engaging a front anchor right locking latch arm with existing OEM attachment points for a removable fitted hard top;

D) affixing the rear anchor portion to top portion of an automobile rear window and roof assembly beginning at a rear boundary of the open space above a driver seat and a passenger seat of the automobile by attaching a rear anchor latch assembly centered on the rear anchor portion fitting into an existing OEM attachment point for a removable fitted hard top, and inserting a rear anchor portion left pin and a rear anchor portion right pin into existing OEM portal openings for the removable fitted hard top in the rear boundary;

E) attaching a left side portion front end to a front anchor left end and attaching a left side portion rear end to a rear anchor left end with provided threaded fasteners;

F) attaching a right side portion front end to a front anchor right end and attaching a right side rear end to a rear anchor right end with provided threaded fasteners;

G) attaching the stabilizing bar left end prong onto the stabilizing bar left end dowl connected to the midpoint connector of the left side portion internal surface and attaching the stabilizing bar right end prong onto the stabilizing bar right end dowl connected to the midpoint connector of the right side portion internal surface providing an inwards folding of the stabilizing bar around the stabilizing bar central pivot point; and H) aligning the stabilizing bar left end and the stabilizing bar right end into the straight configuration regarding the central pivot point causing the flexible stabilizing bar to bow slightly upwards contacting the soft top cover bottom side and supporting and stabilizing the soft top cover.

* * * * *